United States Patent [19]  [11] Patent Number: 4,917,935
Kubicek  [45] Date of Patent: Apr. 17, 1990

[54] CERAMIC PACKING

[75] Inventor: Vladimir Kubicek, Seuzach, Switzerland

[73] Assignee: Sulzer Brothers Limited, Winterthur, Switzerland

[21] Appl. No.: 883,061

[22] Filed: Jul. 8, 1986

[30] Foreign Application Priority Data

Jul. 18, 1985 [CH] Switzerland ............... 03 119/85

[51] Int. Cl.$^4$ .............................................. B32B 3/17
[52] U.S. Cl. ..................................... 428/116; 261/112.2; 428/178; 428/184; 428/185; 428/446; 428/702
[58] Field of Search .............. 428/116, 178, 184, 185, 428/325, 117, 118, 73, 446, 702; 261/112.2; 425/464; 264/44, 60, 61

[56] References Cited

U.S. PATENT DOCUMENTS

| | | | |
|---|---|---|---|
| 3,982,981 | 9/1976 | Takao | 428/184 |
| 4,025,462 | 5/1977 | Cleveland | 252/477 |
| 4,133,369 | 1/1979 | Maire | 164/46 |
| 4,379,109 | 4/1983 | Simpson | 264/60 |
| 4,488,920 | 12/1984 | Danis | 156/155 |

FOREIGN PATENT DOCUMENTS

| | | | |
|---|---|---|---|
| 0699664 | 12/1940 | Fed. Rep. of Germany | 428/116 |
| 2744459 | 4/1979 | Fed. Rep. of Germany | 428/116 |
| 1118912 | 6/1956 | France | 428/116 |

Primary Examiner—Pamela R. Schwartz
Attorney, Agent, or Firm—Kenyon & Kenyon

[57] ABSTRACT

The ceramic packing is cast in one piece and comprises parallel corrugated layers which extend substantially transversely to the longitudinal direction of the packing with at least two joins provided between the adjacent layers.

11 Claims, 2 Drawing Sheets

CERAMIC PACKING

This invention relates to a ceramic packing and to a method and mold for making the ceramic packing.

Heretofore, ceramic packings have been known to be fabricated from individual layers of ceramic material which were connected together, for example by joining using a mortar-like ceramic material and a subsequent firing or by using different connecting materials such as plastics. However, these techniques have been time-consuming. Further, the resulting packings have had strength and corrosion-resistant properties which are unsatisfactory due to the non-homogeneity of the material.

Ceramic packings have also been known from U.S. Pat. No. 4,157,929 wherein plate-like structures are formed of glass filaments and a ceramic coating. However, the techniques employed for making such structures are time-consuming.

Accordingly, it is an object of the invention to provide a ceramic packing having optimum strength and corrosion resistance.

It is another object of the invention to produce a complex multi-layer ceramic packing in one step without time-consuming assembly work.

It is another object of the invention to produce a multi-layer ceramic packing of homogenous structure.

Briefly, the invention provides a one-piece ceramic packing which is comprised of at least two layers disposed in parallel relation to each other and at least one join integrally joined to and between the layers.

The packing is constructed for use, for example, as a packing for mass transfer or heat exchange, for mixers, for separating devices or the like.

The invention also provides a method of forming the ceramic packing. To this end, a mold is formed of a plurality of layers of material in order to define a plurality of cavities disposed in parallel relation to each other with transverse passages connecting the adjacent cavities. Thereafter, a suspension containing a ceramic component is introduced into the cavities and thereafter uniformly distributed through the cavities while fluid is withdrawn from the suspension through the mold layers until the ceramic material remains in the cavities. Subsequently, the mold is heated to a temperature sufficient to remove the layers of mold material while forming a one-piece ceramic packing. In this latter respect, the mold may be heated to a temperature sufficient to burn the layers of mold material and/or to vaporize the layers of mold material. In this regard, the mold layers are made of a material which are susceptible to such burning or vaporization.

The invention also provides a mold for forming a one-piece ceramic packing. In this regard, the mold is comprised of a plurality of pairs of laminar cellulose structures which are stacked in layers to define a plurality of mold cavities with each pair of structures defining a mold cavity therebetween. In addition, the mold layers are provided with a plurality of passages which communicate each mold cavity with an adjacent mold cavity. In this way, introduction of the suspension containing the ceramic component may flow from one mold cavity to another.

Each pair of structures of the mold may also include a plurality of spaced, for example which are integral with one of the structures to as to define projections which extend from the structure.

When the packing is being formed, the suspension containing the ceramic components spreads throughout the mold cavities in each layer as well as through the passages between the layers. Thus, upon firing, for example in a furnace, the resultant structure is homogenous, that is, the joins are formed of the same material as the layers while also being integrally joined to and between the layers. Thus, there is no need for any substantial finishing of the packing after firing.. At the same time, a complex multi-layer structure is formed in a simple manner in a minimum of time.

These and other objects and advantages of the invention will become more apparent from the following detailed description taken in conjunction with the accompanying drawings wherein.

Figure 1:
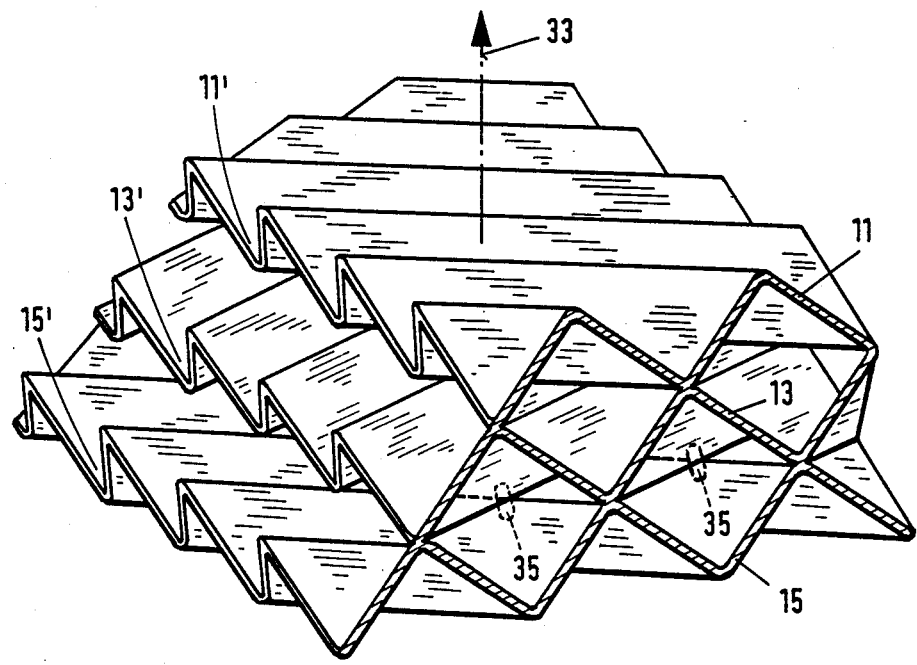
FIG. 1 illustrates a perspective view, partly in section, of a ceramic packing constructed in accordance with the invention.

Referring to FIG. 1, the one-piece ceramic packing is comprised of a plurality of layers, for example three layers 11, 13, 15 which are disposed in spaced apart parallel relation to each other. For example, as indicated, the layers are disposed horizontally with respect to a vertical axis 33, which axis also indicates the longitudinal direction of the ceramic packing. As shown, each layer is in the form of a laminar corrugated structure or plate with each layer having a plurality parallel wave troughs 11', 13', 15' which are disposed transversely of the wave troughs of an adjacent layer. As indicated, the wave troughs of one layer are disposed at an angle of 90° to the troughs of an adjacent layer.

In addition, the packing includes a plurality of joins 35 which are integrally joined to and between the layers 11, 13, 15. As indicated in FIG. 1, each join 35 is located at a point of intersection of a trough of one layer with the crest of an adjacent layer. As indicated, each join 35 is of column shape. However, the joins 35 may also be of elongated or wedge shape.

As also shown in FIG. 1, each corrugated layer 11, 13, 15 defines a plurality of parallel elongated passages with the passages of the respective layers being disposed in criss-crossing relation to each other.

While the layers 11, 13, 15 are shown with smooth surfaces, each layer may also be provided with a structured surface, for example, a roughened surface or one provided with sets of parallel grooves as is known.

Figure 2:
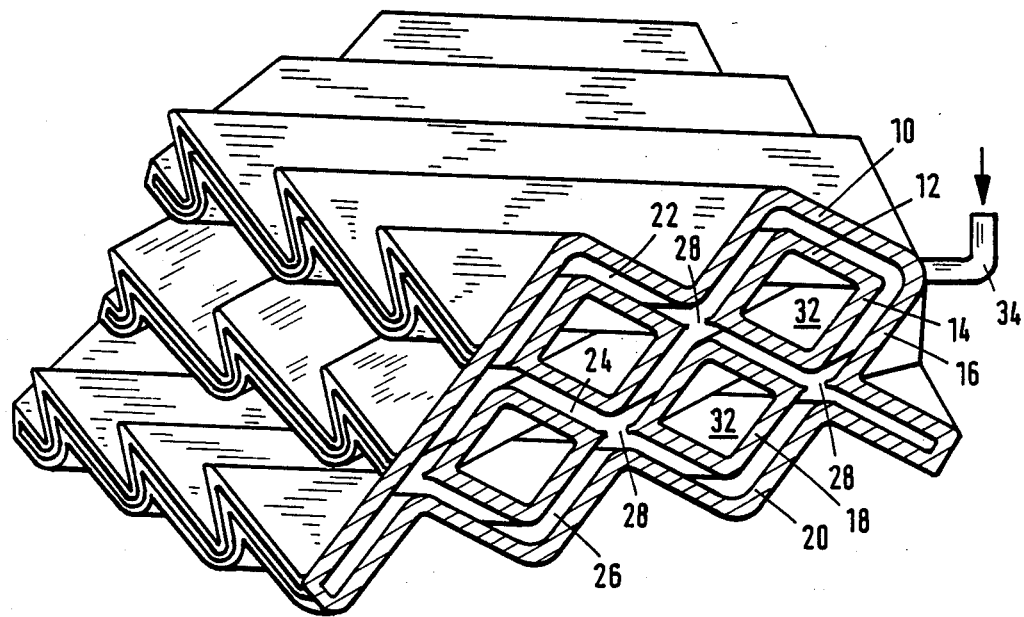
FIG. 2 illustrates a perspective view of a mold for making the packing of FIG. 1 in accordance with the invention.

Referring to FIG. 2, a mold for forming the ceramic packing is comprised of a plurality of pairs of laminar cellulose structures, for example in the form of molded shells or layers 10, 12; 14, 16; 18, 20 which are stacked in layers to define a plurality of mold cavities 22, 24, 26. The cellulose structures may be made of a material such as cardboard. As indicated in FIG. 2, each pair of structures is shaped so as to define a cavity conforming to the shape of the ceramic layer of the packing which is to be formed. The pairs of structures are also stacked in a fashion to conform with the stacked arrangement of the packing layers which are to be molded. In addition, a plurality of passages 28 are provided in the cardboard structures in order to communicate each mold cavity 22, 24, 26 with an adjacent mold cavity.

Figure 3:
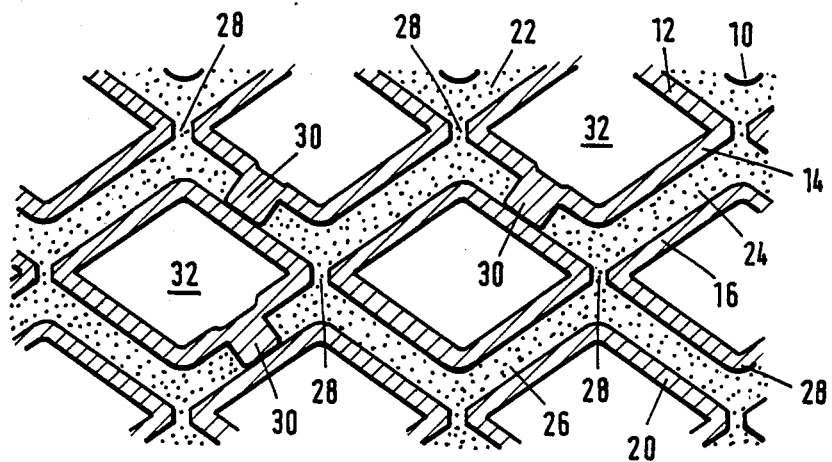
FIG. 3 illustrates a vertical cross sectional view through a modified mold after filling of the mold with a ceramic suspension or ceramic material.
Figure 4:
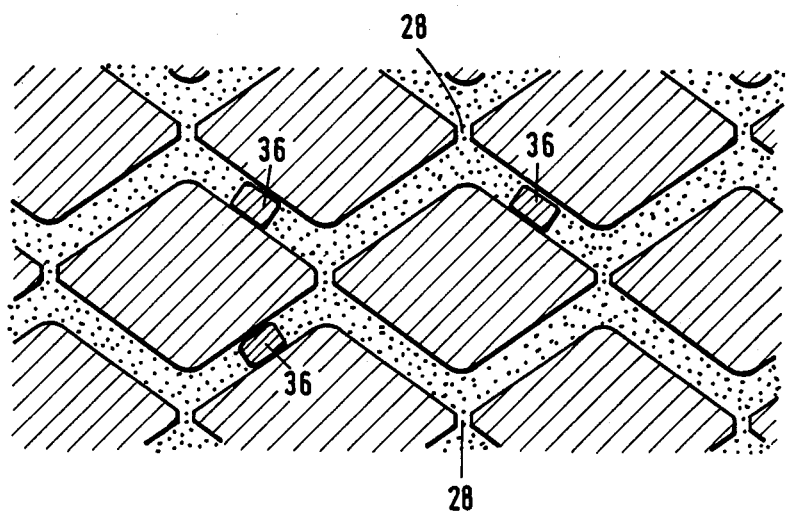
FIG. 4 illustrates a vertical sectional view through a modified mold having loose spacers.

The mold also includes a plurality of spaces 30, as shown in FIG. 4, for bracing the shells of each layer apart. These spacers 30 may be integral with one or the other of the shells, for example, being in the form of projections as indicated in FIG. 3.

As shown in FIG. 2, a plurality of cavities 32 are disposed between the cardboard structures to serve as moisture removing ducts. In addition, a feed opening 34 is connected with the uppermost mold cavity 22 for the introduction of a molding suspension.

Referring to FIGS. 2 and 3, in order to form a ceramic packing, the mold is provided with side walls (not shown) and a thick suspension containing a ceramic component, for example, a suspension comprising 30% kaolin, 25% feldspar, 15% quartz, 28.5% water and about 1.5% soda is poured into the feed opening 34. The suspension then uniformly distributes through the cavities 22, 24, 26 while flowing through the transverse passages 28 from one layer to another and eventually fills the mold cavities 22, 24, 26. During this time, the fluid is withdrawn from the suspension into the mold layers, that is the fluid is absorbed by the cardboard of the layers with excess fluid being drained through the ducts 32. The mold is thereafter dried at about 70° C. for about six hours in a drying and sintering furnace (not shown) with the moist air being evacuated and the evacuation being assisted by the cavities 32.

At the end of the drying process, the mold is heated to a firing temperature of from about 1100° C. to about 1400° C. and maintained at that temperature for three hours. During this time, the mold layers are burned and/or vaporized with the combustion gases being discharged through the cavities 32. This process continues until only the finished ceramic packing, as shown in FIG. 1, remains.

The finished packing thus conforms to the cavities 22, 24, 26 which were defined by the pairs of cardboard shells while the joins 35 conform with the passages 28 between the mold cavities 22, 24, 26.

Referring to FIG. 4, the mold may be formed with a plurality of loose spacers 36 in the form of loosely inserted rods or strips of cardboard. In addition, the cavities 32 may also be filled with similar materials so that upon firing, the material filling the cavities is also removed.

The mold layers or shells may be produced in any known manner, for example by vacuum forming and drying a cellulose slurry comprising mechanical wood pulp, size and water. The layers or shells may also be made of plastics, such as an expanded polystyrene sold under the trademark Styropor. Further, the polystyrene may be made porous or absorbent or may have small passages for draining the fluid.

Further, the mold need not contain only organic material but may also contain inorganic components which, after the burning process, at least partially remains within the molded packing as a residue.

As noted above, the individual layers 11, 13, 15 of the ceramic packing may have any surface structuring. For example, the layers may have passages and/or apertures of any shape and/or be roughened in predetermined patterns and particle sizes. This is obtained by suitable structuring of the layers.

The invention thus provides a one-piece ceramic packing which is made in a homogeneous manner. As such, the packing is of stable strong construction.

Further, the invention provides a method of forming a packing which requires a minimum of time and effort.

Still further, the invention provides a mold for forming a one-piece ceramic packing which is of relatively inexpensive construction.

I claim:

1. A one-piece homogeneous ceramic packing comprising
   at least two corrugated layers disposed in spaced apart parallel relation to each other, each said layer having corrugations disposed in crossing relation with corrugations of an adjacent layer; and
   at least two join integrally formed with and between said layers and being formed solely of the same material as said layers.

2. A one-piece ceramic packing as set forth in claim 1 wherein each layer has a plurality of parallel wave troughs disposed transversely of said wave troughs of an adjacent layer.

3. A one-piece ceramic packing as set forth in claim 2 wherein said troughs of one layer are disposed at an angle of 90° to said troughs of an adjacent layer.

4. A one-piece ceramic packing as set forth in claim 1 wherein each join is of column shape.

5. A one-piece ceramic packing as set forth in claim 1 wherein said layers define elongated passages therebetween.

6. A one-piece ceramic packing as set forth in claim 1 wherein each layer has a structured surface.

7. A one-piece homogeneous ceramic packing comprising
   a plurality of corrugated layers disposed in spaced apart relation, each layer having parallel wave troughs disposed at an angle to said troughs of an adjacent layer; and
   a plurality of joins integrally formed with and between said layers, each said join being located at a point of intersection of one layer with an adjacent layer and being formed solely of the same material as said layers.

8. A one-piece homogeneous ceramic packing as set forth in claim 7 wherein each join is of column shape.

9. A one-piece homogeneous ceramic packing comprising
   at least two corrugated layers disposed in spaced apart parallel relation to each other, each layer having a plurality of troughs disposed transversely of the troughs of an adjacent layer; and
   a plurality of joins integrally formed with and between said layers, each join being located at a point of intersection of a trough of one layer with the crest of an adjacent layer.

10. A one-piece ceramic packing as set forth in claim 9 wherein each layer is a laminar corrugated structure.

11. A one-piece ceramic packing as set forth in claim 10 wherein each layer has a plurality of parallel wave troughs disposed transversely of said wave troughs of an adjacent layer and being formed solely of the same material as said layers.

* * * * *

UNITED STATES PATENT AND TRADEMARK OFFICE
CERTIFICATE OF CORRECTION

PATENT NO. : 4,917,935

DATED : April 17, 1990

INVENTOR(S) : Vladimir Kubicek

It is certified that error appears in the above-identified patent and that said Letters Patent is hereby corrected as shown below:

Column 1, line 66 "spaced," should be -spacers,-

Column 3, line 3 "spaces" should be -spacers-

Column 4, line 57 "layer." should be -layer and being formed solely of the same material as said layers.-

Column 4, line 63 to 64 cancel "and ... layers"

Signed and Sealed this

Twenty-ninth Day of October, 1991

*Attest:*

HARRY F. MANBECK, JR.

*Attesting Officer*  *Commissioner of Patents and Trademarks*